United States Patent
Yamauchi

(10) Patent No.: US 11,754,389 B2
(45) Date of Patent: Sep. 12, 2023

(54) ESTIMATION METHOD, MEASUREMENT METHOD, AND ESTIMATION APPARATUS

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 282 days.

(21) Appl. No.: 17/161,422

(22) Filed: Jan. 28, 2021

(65) Prior Publication Data
US 2021/0231434 A1 Jul. 29, 2021

(30) Foreign Application Priority Data
Jan. 29, 2020 (JP) ................................ 2020-012467

(51) Int. Cl.
*G01B 11/24* (2006.01)
*G06T 7/50* (2017.01)
(Continued)

(52) U.S. Cl.
CPC .......... *G01B 11/24* (2013.01); *G01B 11/2504* (2013.01); *G06T 7/50* (2017.01);
(Continued)

(58) Field of Classification Search
CPC . G01B 11/24; G01B 11/2504; G01B 11/2513; G01B 11/2527; G01B 11/2536; G06T 7/50; G06T 7/70
See application file for complete search history.

(56) References Cited

U.S. PATENT DOCUMENTS

2007/0285672 A1* 12/2007 Mukai ................ G01B 11/2518
356/606
2009/0097039 A1 4/2009 Kawasaki et al.
(Continued)

FOREIGN PATENT DOCUMENTS

JP  2004-198212 A  7/2004
JP  2009-115612 A  5/2009
(Continued)

OTHER PUBLICATIONS

Wenguo Li, Suping Fang, Shaojun Duan, "3D Shape Measurement Based on Structured Light Projection Applying Polynomial Interpolation Technique", Optik, vol. 124, Issue 1, 2013 (Year: 2013).*

*Primary Examiner* — Dominic J Bologna
(74) *Attorney, Agent, or Firm* — Oliff PLC

(57) ABSTRACT

An estimation method includes projecting a pattern image onto an object via a zoom lens, generating imaging data by capturing the pattern image on the object, estimating, based on the imaging data, a position of a principal point of the zoom lens during the projection of the pattern image, and estimating, based on a first characteristic value representing a characteristic of the zoom lens at time when the principal point of the zoom lens is present in a first position and a second characteristic value representing a characteristic of the zoom lens at time when the principal point of the zoom lens is present in a second position, a characteristic value representing a characteristic of the zoom lens at time when the principal point of the zoom lens is present in the estimated position.

8 Claims, 7 Drawing Sheets

(51) Int. Cl.
    *G06T 7/70*      (2017.01)
    *G01B 11/25*     (2006.01)
(52) U.S. Cl.
    CPC ............ *G06T 7/70* (2017.01); *G01B 11/2513* (2013.01); *G01B 11/2527* (2013.01); *G01B 11/2536* (2013.01)

(56) References Cited

U.S. PATENT DOCUMENTS

2013/0155189 A1\* 6/2013 Lin ........................... G06T 7/70
                                                      348/46
2015/0124055 A1  5/2015 Kotake et al.

FOREIGN PATENT DOCUMENTS

| JP | 2010183219 A | \* | 8/2010 |
| JP | 2012-132739 A | | 7/2012 |
| JP | 2015-111101 A | | 6/2015 |
| WO | 2006/120759 A1 | | 11/2006 |

\* cited by examiner

ESTIMATION METHOD, MEASUREMENT METHOD, AND ESTIMATION APPARATUS

The present application is based on, and claims priority from JP Application Serial Number 2020-012467, filed Jan. 29, 2020, the disclosure of which is hereby incorporated by reference herein in its entirety.

BACKGROUND

1. Technical Field

The present disclosure relates to an estimation method, a measurement method, and an estimation apparatus.

2. Related Art

There has been known a three-dimensional measurement apparatus that includes a projection device and an imaging device and measures a three-dimensional shape of an object with a pattern projection method. In order to reduce an error due to characteristics of a projection lens included in the projection device, for example, an error due to lens distortion, such a three-dimensional measurement apparatus suppresses the error using internal parameters of the projection lens. Examples of the internal parameters of the projection lens include a focal length of the projection lens and lens distortion of the projection lens.

WO 2006/120759 (Patent Literature 1) discloses a three-dimensional measurement apparatus capable of calculating internal parameters of a projection lens. In order to obtain the internal parameters of the projection lens, the three-dimensional measurement apparatus disclosed in Patent Literature 1 repeats projection and imaging while moving an object on which a pattern image is projected or while moving one of a projection device and an imaging device.

In order to obtain parameters necessary for three-dimensional measurement, the three-dimensional measurement apparatus disclosed in Patent Literature 1 has to repeat the projection and the imaging while moving the object or moving one of the projection device and the imaging device and thus is time-consuming.

SUMMARY

An estimation method according to an aspect of the present disclosure includes: projecting a pattern image onto an object via a zoom lens; generating imaging data by capturing the pattern image on the object; estimating, based on the imaging data, a position of a principal point of the zoom lens during the projection of the pattern image; and estimating, based on a first characteristic value representing a characteristic of the zoom lens at time when the principal point of the zoom lens is present in a first position and a second characteristic value representing a characteristic of the zoom lens at time when the principal point of the zoom lens is present in the estimated position.

A measurement method according to an aspect of the present disclosure includes: the estimation method; and measuring a three-dimensional shape of the object using the characteristic value of the zoom lens at the time when the principal point of the zoom lens is present in the estimated position and positional relation information.

An estimation apparatus according to an aspect of the present disclosure includes: a projecting section configured to project a pattern image onto an object via a zoom lens; a camera configured to generate imaging data by capturing the pattern image on the object; a position estimating section configured to estimate, based on the imaging data, a position of a principal point of the zoom lens during the projection of the pattern image; and a characteristic-value estimating section configured to estimate, based on a first characteristic value representing a characteristic of the zoom lens at time when the principal point of the zoom lens is present in a first position and a second characteristic value representing a characteristic of the zoom lens at time when the principal point of the zoom lens is present in a second position, a characteristic value representing a characteristic of the zoom lens at time when the principal point of the zoom lens is present in the estimated position.

DESCRIPTION OF EXEMPLARY EMBODIMENTS

A. First Embodiment

A1: Measurement Apparatus 100

Figure 1:
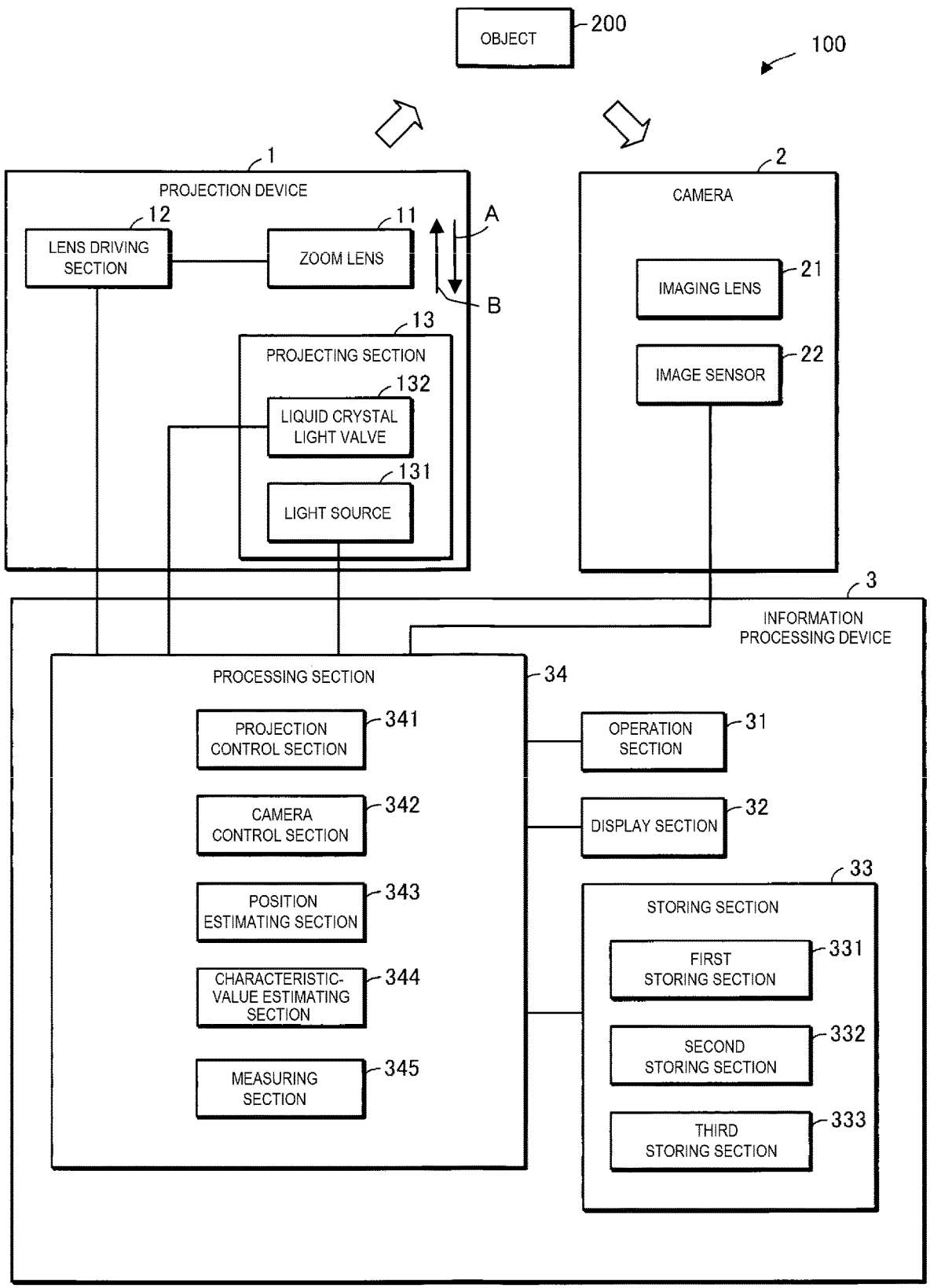
FIG. 1 is a diagram showing a measurement apparatus according to a first embodiment.

FIG. 1 is a diagram showing a measurement apparatus 100 according to a first embodiment. The measurement apparatus 100 includes a projection device 1, a camera 2, and an image processing device 3. The measurement apparatus 100 measures a three-dimensional shape of an object 200 with the principle of triangulation using the projection device 1 and the camera 2.

The measurement apparatus 100 projects a gray code pattern in a space coding method onto the object 200. The measurement apparatus 100 generates imaging data by imaging the gray code pattern on the object 200. The measurement apparatus 100 measures a three-dimensional shape of the object 200 based on the imaging data.

Figure 2:
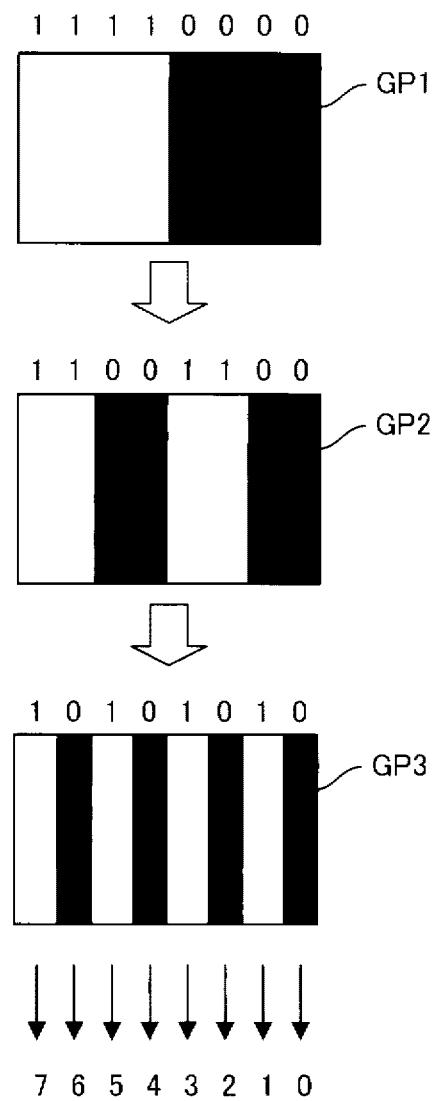
FIG. 2 is a diagram showing an example of gray code patterns.

FIG. 2 is a diagram showing an example of gray code patterns GP1 to GP3. Each of the gray code patterns GP1 to GP3 is a pattern, a black portion of which is represented as "0" and a white portion of which is represented as "1".

The measurement apparatus 100 mutually associates a first specific position in the projected gray code patterns GP1 to GP3 and a second specific position corresponding to the first specific position in a captured image represented by the imaging data. For example, the measurement apparatus 100 mutually associates a first specific position indicated by "010"="2" in the projected gray code patterns GP1 to GP3 and a second specific position indicated by "010"="2" in the captured image. The measurement apparatus 100 measures a three-dimensional shape of the object 200 based on a positional relation between the first specific position and the second specific position.

The number of gray code patterns is not limited to three. In addition to the vertical-stripe gray code patterns GP1 to GP3, horizontal-stripe gray code patterns may be used. The measurement apparatus 100 may measure a three-dimensional shape of the object 200 using patterns different from the gray code patterns GP1 to GP3. For example, the measurement apparatus 100 may measure a three-dimensional shape of the object 200 using patterns used in a phase shift method.

The projection device 1 of the measurement apparatus 100 includes a zoom lens 11 as a projection lens. The measurement apparatus 100 also functions as an estimation apparatus that estimates parameters that fluctuate according to a focal length of the zoom lens 11. In the following explanation, the parameters that fluctuate according to the focal length of the zoom lens 11 are referred to as "estimation target parameters". Specific examples of the estimation target parameters are explained below.

When estimating estimation target parameters, the measurement apparatus 100 projects a pattern image PI different from a gray code pattern onto the object 200 and estimates estimation target parameters based on imaging data generated by capturing the pattern image PI on the object 200.

Figure 3:
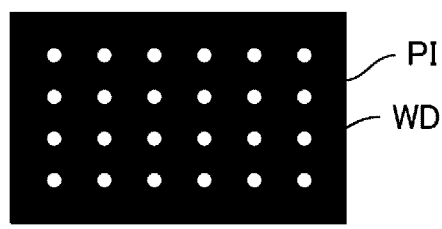
FIG. 3 is a diagram showing an example of a pattern image.

FIG. 3 is a diagram showing an example of the pattern image PI. The pattern image PI represents twenty-four white dots WD located in a matrix shape. The pattern image PI is not limited to the image shown in FIG. 3 and can be changed as appropriate. The measurement apparatus 100 may use a gray code pattern as the pattern image PI.

A2: Projection Device 1

In FIG. 1, the projection device 1 is, for example, a projector. The projection device 1 includes the zoom lens 11, a lens driving section 12, and a projecting section 13.

A focal length of the zoom lens 11 is changeable in a range of a first focal length f1 to a second focal length f2. The first focal length f1 is longer than the second focal length f2. The focal length of the zoom lens 11 being set to the first focal length f1 means that the focal length of the zoom lens 11 is "tele end". The focal length of the zoom lens 11 being set to the second focal length f2 means that the focal length of the zoom lens 11 is "wide end".

The position of a principal point of the zoom lens 11 moves according to the focal length of the zoom lens 11. According to a decrease in the focal length of the zoom lens 11, the position of the principal point of the zoom lens 11 moves in a first arrow A direction. According to an increase in the focal length of the zoom lens 11, the position of the principal point of the zoom lens 11 moves in a second arrow B direction. The second arrow B direction is the opposite direction of the first arrow A direction.

A position of the principal point of the zoom lens 11 at the time when the focal length of the zoom lens 11 is the "tele end" is referred to as "first position N1". A position of the principal point of the zoom lens 11 at the time when the focal length of the zoom lens 11 is the "wide end" is referred to as "second position N2". A function of changing the focal length in the zoom lens 11 is referred to as "zoom function".

The lens driving section 12 is, for example, a motor. The lens driving section 12 changes the focal length of the zoom lens 11. The focal length of the zoom lens 11 may be manually changed. In this case, the lens driving section 12 may be omitted.

The projecting section 13 projects a projection image onto the object 200 via the zoom lens 11. When the measurement apparatus 100 measures a three-dimensional shape of the object 200, the projecting section 13 projects, as the projection image, the gray code patterns GP1 to GP3 illustrated in FIG. 2. When the measurement apparatus 100 estimates estimation target parameters, the projecting section 13 projects, as the projection image, the pattern image PI illustrated in FIG. 3. The projecting section 13 includes a light source 131 and a liquid crystal light valve 132.

The light source 131 is an LED (Light Emitting Diode). The light source 131 is not limited to the LED and may be, for example, a xenon lamp, an ultra-high pressure mercury lamp, or a laser light source.

Figure 4:
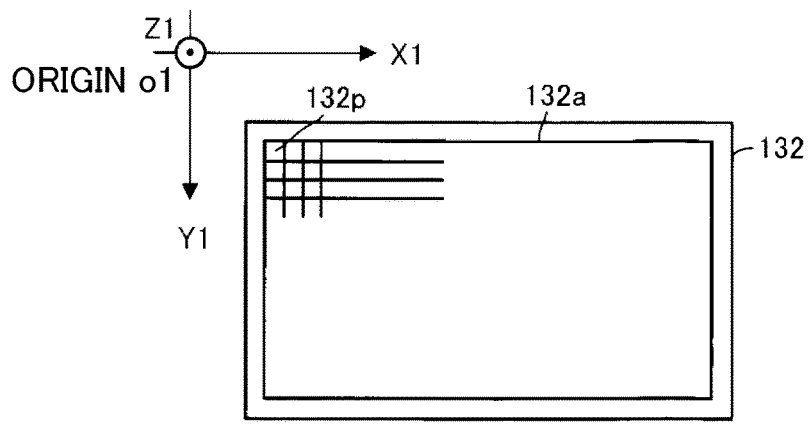
FIG. 4 is a diagram showing an example of a liquid crystal light valve.

The liquid crystal light valve 132 is configured by, for example, a liquid crystal panel in which liquid crystal is present between a pair of transparent substrates. The liquid crystal light valve 132 includes a rectangular pixel region 132a as shown in FIG. 4. The pixel region 132a includes a plurality of pixels 132p located in a matrix shape.

A three-dimensional first coordinate system H1 is applied to the liquid crystal light valve 132. The first coordinate system H1 is a coordinate system of the projection device 1. An origin o1 of the first coordinate system H1 is set in the position of the principal point of the zoom lens 11. The first coordinate system H1 is defined by an X1 axis, a Y1 axis, and a Z1 axis.

Each of a direction of the X1 axis, a direction of the Y1 axis, and a direction of the Z1 axis is determined according to the direction of the liquid crystal light valve 132. The direction of the X1 axis is the horizontal direction of the liquid crystal light valve 132, in other words, the lateral direction of the liquid crystal light valve 132. The direction of the Y1 axis is orthogonal to the direction of the X1 axis. The direction of the Y1 axis is the vertical direction of the liquid crystal light valve 132, in other words, the longitudinal direction of the liquid crystal light valve 132. The direction of the Z1 axis is orthogonal to each of the direction of the X1 axis and the direction of the Y1 axis.

The distance from the liquid crystal light valve 132 to the origin o1 of the first coordinate system H1, that is, the principal point of the zoom lens 11 in the Z1-axis direction fluctuates according to the focal length of the zoom lens 11.

In the liquid crystal light valve 132, a driving voltage corresponding to image data is applied to the liquid crystal for each of the pixels 132p. The pixels 132p are set to light transmittance based on the driving voltage. Light emitted from the light source 131 is modulated by the pixel region 132a. The light modulated by the liquid crystal light valve 132 travels to the zoom lens 11. The liquid crystal light valve 132 is an example of a light modulation device. The zoom lens 11 projects the light modulated by the liquid crystal light valve 132, that is, a projection image onto the object 200.

A3: Camera 2

The camera 2 generates imaging data by capturing a projected image on the object 200. For example, the camera 2 generates a plurality of imaging data by imaging each of the gray code patterns GP1 to GP3 on the object 200. The camera 2 generates imaging data by capturing the pattern image PI on the object 200. The camera 2 includes an imaging lens 21 and an image sensor 22.

The imaging lens 21 forms, on the image sensor 22, an optical image of the projected image on the object 200, for example, an optical image of the pattern image PI on the object 200. The imaging lens 21 does not have the zoom function.

Figure 5:
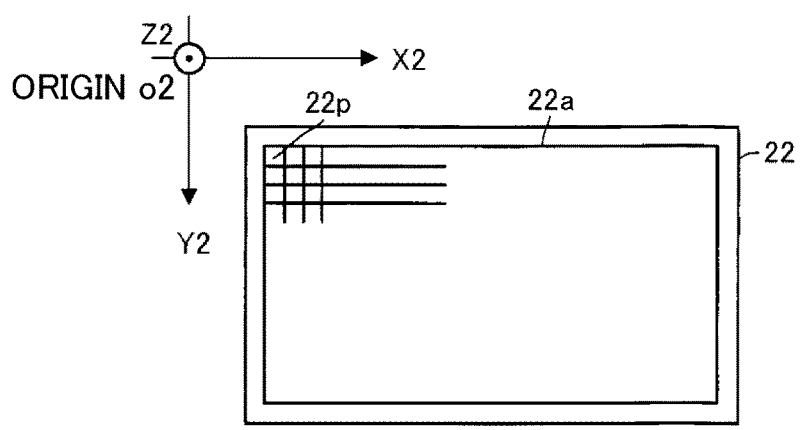
FIG. 5 is a diagram showing an example of an image sensor.

The image sensor 22 is, for example, a CCD (Charge Coupled Device) image sensor. The image sensor 22 is not limited to the CCD image sensor and may be, for example, a CMOS (Complementary Metal Oxide Semiconductor) image sensor. The image sensor 22 generates imaging data based on the optical image of the projection image formed by the imaging lens 21, for example, the optical image of the pattern image PI. The image sensor 22 includes a rectangular imaging region 22a as illustrated in FIG. 5. The imaging region 22a includes a plurality of cells for light reception 22p located in a matrix shape.

A three-dimensional second coordinate system H2 is applied to the image sensor 22. The second coordinate system H2 is a coordinate system of the camera 2. An origin o2 of the second coordinate system H2 is set in the position of the principal point of the imaging lens 21. The second coordinate system H2 is defined by a X2 axis, a Y2 axis, and a Z2 axis.

Each of a direction of the X2 axis, a direction of the Y2 axis, and a direction of the Z2 axis is determined according to the direction of the image sensor 22. The direction of the X2 axis is the horizontal direction of the image sensor 22, in other words, the lateral direction of the image sensor 22. The direction of the Y2 axis is orthogonal to the direction of the X2 axis. The direction of the Y2 axis is the vertical direction of the image sensor 22, in other words, the longitudinal direction of the image sensor 22. The direction of the Z2 axis is orthogonal to each of the direction of the X2 axis and the direction of the Y2 axis.

The distance from the image sensor 22 to the origin o2 of the second coordinate system H2, that is, the principal point of the imaging lens 21 in the Z2-axis direction is equal to the focal length of the imaging lens 21.

A4: Information Processing Device 3

The information processing device 3 is, for example, a PC (Personal Computer). The information processing device 3 is not limited to the PC and may be a dedicated computer. The information processing device 3 estimates estimation target parameters based on imaging data of the pattern image PI. The information processing device 3 measures a three-dimensional shape of the object 200 with the principle of triangulation based on imaging data of each of the gray code patterns GP1 to GP3 and the estimated estimation target parameters.

A5: Example of Triangulation

Figure 6:
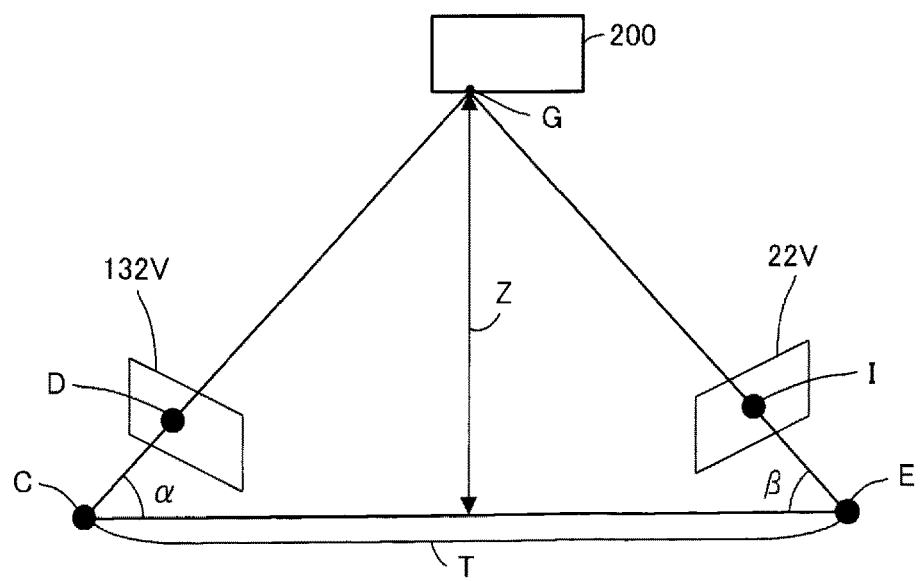
FIG. 6 is a diagram for explaining a method of measuring a three-dimensional shape of an object.

FIG. 6 is a diagram for explaining a method of measuring a three-dimensional shape of the object 200. A principal point position C of the zoom lens 11 fluctuates according to the focal length of the zoom lens 11. A first reference point D is a position where an image projected onto a measurement point G of the object 200 is present in the pattern image PI. In FIG. 6, a virtual liquid crystal light valve 132V is shown instead of the liquid crystal light valve 132. The virtual liquid crystal light valve 132V is set, based on the principal point position C of the zoom lens 11, in a position point-symmetric to the liquid crystal light valve 132. In epipolar geometry used in three-dimensional measurement, in general, the virtual liquid crystal light valve 132V is used. Therefore, the virtual liquid crystal light valve 132V is shown in FIG. 6.

A principal point position E of the imaging lens 21 is fixed because the focal length of the imaging lens 21 is fixed. A second reference point I is a position where an image of the measurement point G is present in a captured image represented by imaging data. In FIG. 6, a virtual image sensor 22V is shown instead of the image sensor 22. The virtual image sensor 22V is set, based on the principal point position E of the imaging lens 21, in a position point-symmetric to the image sensor 22. In the epipolar geometry, in general, the virtual image sensor 22V is used. Therefore, the virtual image sensor 22V is shown in FIG. 6.

In FIG. 6, an angle α is shown as an angle formed by a straight line CE and a straight line CG, an angle τ3 is shown as an angle formed by the straight line CE and a straight line EG, and length T is shown as the length of the straight line CE. A distance Z to the measurement point G of the object 200 can be represented by the following.

$$Z=T((1/\tan \alpha)+(1/\tan \beta))$$

The information processing device 3 measures a three-dimensional shape of the object 200 by calculating the distance Z while changing the measurement point G.

The principal point position C of the zoom lens 11, the first reference point D, and the position of the virtual liquid crystal light valve 132V are respectively specified by the first coordinate system H1. The principal point position E of the imaging lens 21, the second reference point I, and the position of the virtual image sensor 22V are respectively specified by the second coordinate system H2.

Figure 7:
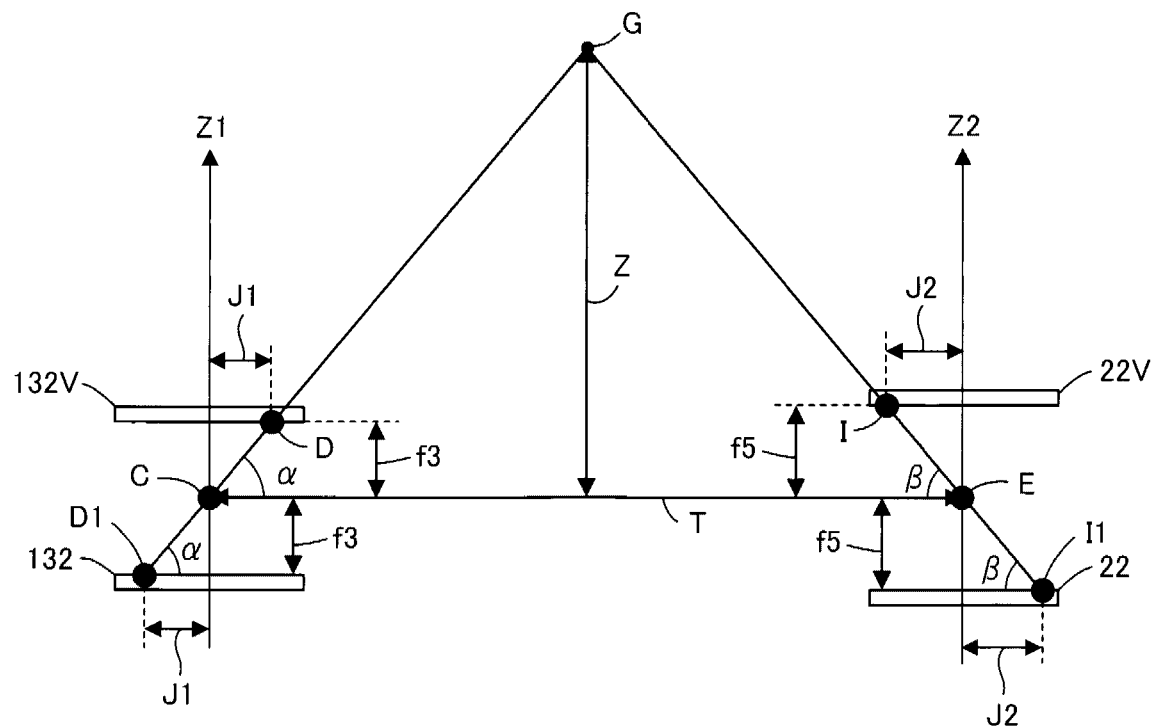
FIG. 7 is a diagram for explaining a method of measuring a three-dimensional shape of the object.

In order to facilitate the calculation of the distance Z, the information processing device 3 corrects, to a virtual positional relation shown in FIG. 7, a positional relation among the principal point position C of the zoom lens 11, the first reference point D, the principal point position E of the imaging lens 21, the second reference point I, the measurement point G, a substantive position of the liquid crystal light valve 132, the position of the virtual liquid crystal light valve 132V, a substantive position of the image sensor 22, and the position of the virtual image sensor 22V.

In FIG. 7, tan α is represented by a distance J1 specified by the position of the first reference point D and a focal length f3 of the zoom lens 11 and tan β is represented by a distance J2 specified by the position of the second reference point I and a focal length f5 of the imaging lens 21. In FIG. 7, a position corresponding to the first reference point D in the liquid crystal light valve 132 is shown as a third reference point D1 and a position corresponding to the second reference point I in the image sensor 22 is shown as a fourth reference point I1. The third reference point D1 is set, based on the principal point position C of the zoom lens 11, in a position point-symmetric to the first reference point D. The fourth reference point I1 is set, based on the principal point position E of the imaging lens 21, in a position point-symmetric to the second reference point I.

In order to set the virtual positional relation shown in FIG. 7, the information processing device 3 uses internal parameters of the zoom lens 11, internal parameters of the imaging lens 21, external parameters indicating a positional relation between the projection device 1 and the camera 2, the substantive position of the liquid crystal light valve 132, and the substantive position of the image sensor 22.

The internal parameters of the zoom lens 11 indicate the focal length of the zoom lens 11, lens distortion of the zoom lens 11, a center offset during attachment of the zoom lens 11, and optical axis angle deviation during the attachment of the zoom lens 11. The center offset during the attachment of the zoom lens 11 indicates a deviation amount between an actual center position of the zoom lens 11 and a center position in design of the zoom lens 11. The optical axis angle deviation during the attachment of the zoom lens 11 indicates an angle of deviation between an actual optical axis of the zoom lens 11 and an optical axis in design of the zoom lens 11.

The internal parameters of the imaging lens 21 indicate the focal length of the imaging lens 21, lens distortion of the imaging lens 21, a center offset during attachment of the imaging lens 21, and optical axis angle deviation during the attachment of the imaging lens 21. The center offset during the attachment of the imaging lens 21 indicates a deviation amount between an actual center position of the imaging lens 21 and a center position in design of the imaging lens 21. The optical axis angle deviation during the attachment of the imaging lens 21 indicates an angle of deviation between an actual optical axis of the imaging lens 21 and an optical axis in design of the imaging lens 21.

The external parameters indicate a rotation matrix R1 and a translation matrix T1. The rotation matrix R1 is a matrix based on a deviation angle between the first coordinate system H1 and the second coordinate system H2. Specifically, the rotation matrix R1 is a matrix for aligning the direction of the X2 axis with the direction of the X1 axis, aligning the direction of the Y2 axis with the direction of the Y1 axis, and aligning the direction of the Z2 axis with the direction of the Z1 axis. The translation matrix T1 is a matrix based on a positional deviation amount between the principal point position C of the zoom lens 11 and the principal point position E of the imaging lens 21.

The information processing device 3 specifies the principal point position C of the zoom lens 11 using, for example, the substantive position of the liquid crystal light valve 132 and the focal length of the zoom lens 11. As an example, the information processing device 3 specifies, as the principal point position C of the zoom lens 11, a position separating by the focal length of the zoom lens 11 in the Z1-axis direction from the center position set in the liquid crystal light valve 132.

In FIG. 7, the first reference point D and the third reference point D1 are located on a straight line passing the principal point position C of the zoom lens 11 and the measurement point G.

Figure 8:
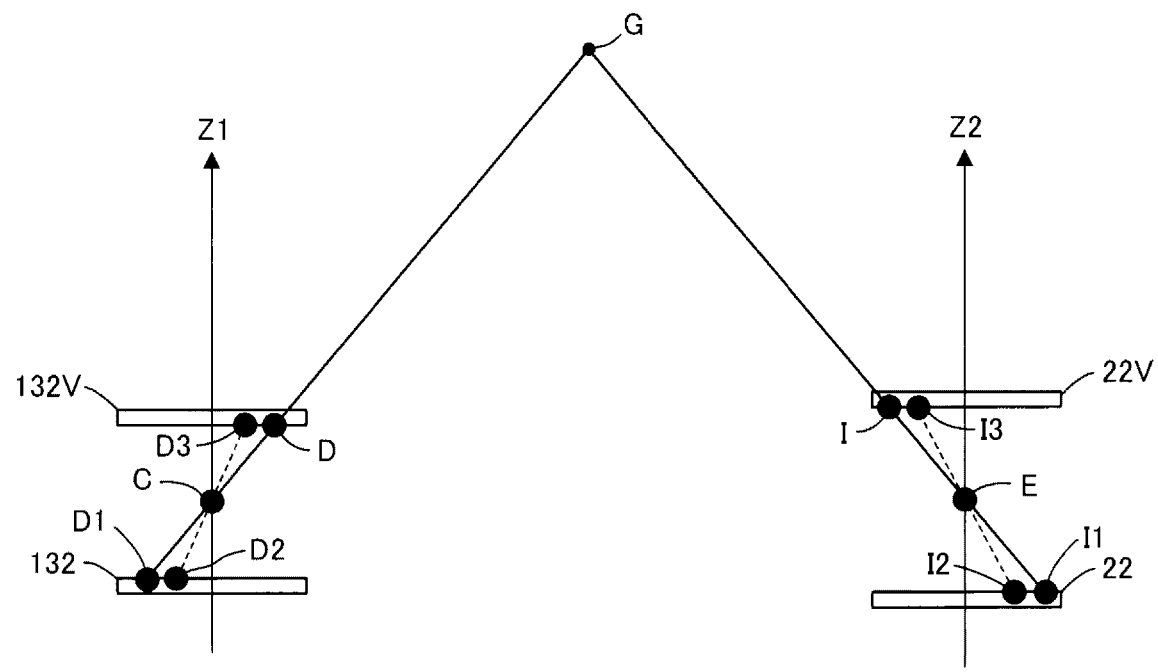
FIG. 8 is a diagram showing necessity of correction in triangulation.

However, as shown in FIG. 8, in the liquid crystal light valve 132, a first presence position D2 where an image to be projected onto the measurement point G is actually present is not located on the straight line passing the principal point position C of the zoom lens 11 and the measurement point G and is located in a place different from the third reference point D1 because of, for example, the lens distortion of the zoom lens 11 and the optical axis angle deviation during the attachment of the zoom lens 11.

In the virtual liquid crystal light valve 132V, based on the principal point position C of the zoom lens 11, a third presence position D3 point-symmetric to the first presence position D2 is also not located on the straight line passing the principal point position C of the zoom lens 11 and the measurement point G and is located in a place different from the first reference point D.

Accordingly, the information processing device 3 specifies the position of the third reference point D1 and the position of the first reference point D by correcting the first presence position D2 based on the focal length of the zoom lens 11, the center offset during the attachment of the zoom lens 11, the optical axis angle deviation during the attachment of the zoom lens 11, and the lens distortion of the zoom lens 11.

The information processing device 3 specifies the principal point position E of the imaging lens 21 using, for example, the substantive position of the image sensor 22 and the focal length of the imaging lens 21. As an example, the information processing device 3 specifies, as the principal point position E of the imaging lens 21, a position separating by the focal length of the imaging lens 21 in the Z2-axis direction from the center position in design of the image sensor 22.

In FIG. 7, the second reference point I and the fourth reference point I1 are located on a straight line passing the principal point position E of the imaging lens 21 and the measurement point G.

However, as shown in FIG. 8, in the image sensor 22, a second presence position I2 where an image of the measurement point G is actually present is not located on the straight line passing the principal point position E of the imaging lens 21 and the measurement point G and is located in a place different from the fourth reference pointer I1 because of, for example, the lens distortion of the imaging lens 21 and the optical axis angle deviation during the attachment of the imaging lens 21.

In the virtual image sensor 22V, based on the principal point position E of the imaging lens 21, a fourth presence position I3 point-symmetric to the second presence position I2 is also not located on the straight line passing the principal point position E of the imaging lens 21 and the measurement point G and is located in a place different from the second reference point I.

Accordingly, the information processing device 3 specifies the position of the fourth reference pointer I1 and the position of the second reference point I by correcting the second presence position I2 based on the focal length of the imaging lens 21, the center offset during the attachment of the imaging lens 21, the optical axis angle deviation during the attachment of the imaging lens 21, and the lens distortion of the imaging lens 21.

The information processing device 3 converts a coordinate of the second coordinate system H2 into a coordinate of the first coordinate system H1 using the rotation matrix R1 and the translation matrix T1.

A6: Influence of the Zoom Function in the Zoom Lens 11

As explained above, the zoom lens 11 has the zoom function. Elements affected by the zoom function are confirmed in the internal parameters of the zoom lens 11, the internal parameters of the imaging lens 21, and the external parameters.

A7: Elements Affected by the Zoom Function

In the internal parameters of the zoom lens 11, the focal length of the zoom lens 11 fluctuates with the zoom function. The principal point position C of the zoom lens 11 fluctuates according to the fluctuation of the focal length of the zoom lens 11. When the principal point position C of the zoom lens 11 fluctuates, the translation matrix T1 of the external parameters fluctuates. When the principal point position C of the zoom lens 11 fluctuates, the position of the virtual liquid crystal light valve 132V illustrated in FIG. 6, FIG. 7, and FIG. 8 fluctuates.

A8: Elements not Affected by the Zoom Function

In the internal parameters of the zoom lens 11, the optical axis angle deviation during the attachment of the zoom lens 11 is not affected by the zoom function. The internal parameters of the imaging lens 21 are not affected by the zoom function. In the external parameters, the rotation matrix R1 is not affected by the zoom function. The substantive position of the liquid crystal light valve 132, the substantive position of the image sensor 22, and the principal point position E of the imaging lens 21 are not affected by the zoom function.

A9: Elements Affected by the Zoom Function in Some Cases and not Affected by the Zoom Function in Other Cases Among the internal parameters of the zoom lens 11, the lens distortion of the zoom lens 11 and the center offset of the zoom lens 11 are considered to be affected by the zoom function in some cases and not affected by the zoom function in other cases depending on the structure of the zoom lens 11. In the following explanation, it is assumed that the lens distortion of the zoom lens 11 is affected by the zoom function and the center offset of the zoom lens 11 is not affected by the zoom function.

A10: Estimation Target Parameters

Accordingly, the elements affected by the zoom function, that is, estimation target parameters are the focal length of the zoom lens 11, the lens distortion of the zoom lens 11, and the translation matrix T1. In relation to these elements, it is necessary to estimate the principal point position C of the zoom lens 11 and the position of the imaginary liquid crystal light valve 132V.

The information processing device 3 estimates these elements by using epipolar constraint or the like and measures a three-dimensional shape of the object 200 using a result of the estimation.

A11: Example of the Information Processing Device 3

As illustrated in FIG. 1, the information processing device 3 includes an operation section 31, a display section 32, a storing section 33, and a processing section 34.

The operation section 31 is, for example, a keyboard, a mouse, an operation button, an operation key, or a touch panel. The operation section 31 receives input operation of a user.

The display section 32 is a display, for example, an FPD (Flat Panel Display) such as a liquid crystal display, a plasma display, or an organic EL (Electro Luminescence) display. The display section 32 displays various kinds of information.

The storing section 33 is a recording medium readable by the processing section 34. The storing section 33 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

The storing section 33 stores programs to be executed by the processing section 34 and various data used by the processing section 34. The storing section 33 includes a first storing section 331, a second storing section 332, and a third storing section 333.

The first storing section 331 stores first characteristic information concerning the elements affected by the zoom function. The first characteristic information indicates the first focal length f1 of the zoom lens 11 and the lens distortion of the zoom lens 11 among internal parameters of the zoom lens 11 at the time when the focal length of the zoom lens 11 is the tele end, that is, at the time when the position of the principal point of the zoom lens 11 is the first position N1. The first characteristic information further indicates the first position N1.

The second storing section 332 stores second characteristic information concerning the elements affected by the zoom function. The second characteristic information indicates the second focal length f2 of the zoom lens 11 and the lens distortion of the zoom lens 11 among internal parameters of the zoom lens 11 at the time when the focal length of the zoom lens 11 is the wide end, that is, at the time when the position of the principal point of the zoom lens 11 is the second position N2. The second characteristic information further indicates the second position N2.

The third storing section 333 stores third characteristic information concerning the elements not affected by the zoom function. The third characteristic information indicates the center offset during the attachment of the zoom lens 11, the optical axis angle deviation during the attachment of the zoom lens 11, the focal length f5 of the imaging lens 21, the lens distortion of the imaging lens 21, the center offset during the attachment of the imaging lens 21, the optical axis angle deviation during the attachment of the imaging lens 21, the substantive position of the image sensor 22, and substantive position of the liquid crystal light valve 132, and the pattern image PI.

The processing section 34 is configured by, for example, one or a plurality of processors. As an example, the processing section 34 is configured by one or a plurality of CPUs (Central Processing Units). A part or all of functions of the processing section 34 may be configured by a circuit such as a DSP (Digital Signal Processor), an ASIC (Application Specific Integrated Circuit), a PLD (Programmable Logic Device), or an FPGA (Field Programmable Gate Array). The processing section 34 executes various kinds of processing in parallel or sequentially.

The processing section 34 reads a program from the storing section 33. The processing section 34 executes the program to thereby realize a projection control section 341, a camera control section 342, a position estimating section 343, a characteristic-value estimating section 344, and a measuring section 345.

The projection control section 341 controls the projection device 1 to thereby cause the projection device 1 to project a projection image toward the object 200.

The camera control section 342 controls the camera 2 to thereby cause the camera 2 to generate imaging data.

The position estimating section 343 estimates, based on the imaging data, a position of the principal point of the zoom lens 11 during the projection of the pattern image PI. In the following explanation, the position of the principal point of the zoom lens 11 during the projection of the pattern image PI is referred to as "projection time principal point position".

Figure 9:
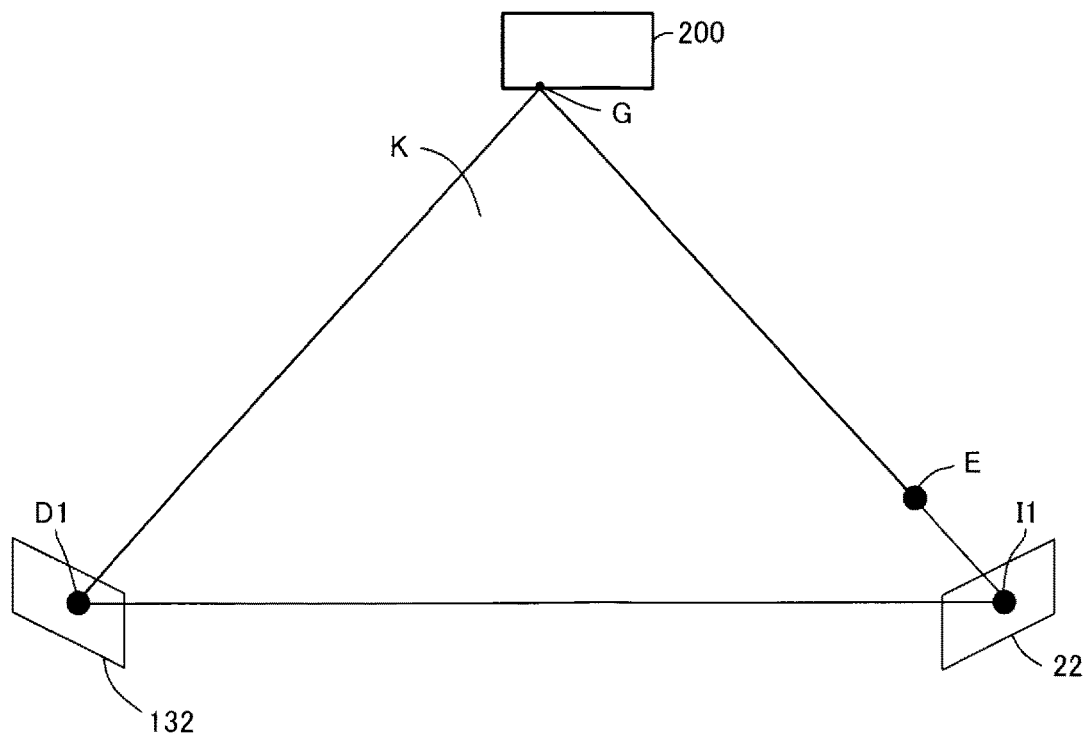
FIG. 9 is a diagram showing an example of an epipolar plane.

The position estimating section 343 estimates a projection-time principal point position based on epipolar constraint between the projection device 1 and the camera 2. As an example, first, as shown in FIG. 9, the position estimating section 343 specifies, based on imaging data, an epipolar plane K including the principal point position E of the imaging lens 21, the third reference point D1, and the fourth reference point I1. The projection-time principal point position is present in any position on the epipolar plane K.

The position estimating section 343 specifies, based on the imaging data, the fourth reference point I1 among three positions of the principal point position E of the imaging lens 21, the third reference point D1, and the fourth reference point I1. The position estimating section 343 specifies the principal point position E of the imaging lens 21 and the third reference point D1 based on the information stored in the storing section 33, for example, the substantive position of the image sensor 22, the internal parameters of the imaging lens 21, the substantive position of the liquid crystal light valve 132, and the pattern image PI. That is, among the information necessary for specifying the epipolar plane K, information functioning like a variable is only the imaging data.

For example, the position-estimating section 343 estimates the second presence position I2 shown in FIG. 8 based on the imaging data and the substantive position of the image sensor 22. The position estimating section 343 specifies the fourth reference point I1 based on the second presence position I2 and the internal parameters of the imaging lens 21. The position estimating section 343 specifies the principal point position E of the imaging lens 21 based on the substantive position of the image sensor 22 and the internal parameters of the imaging lens 21. The position estimating section 343 specifies the third reference point D1 based on the substantive position of the liquid crystal light valve 132, the first presence position D2 in the pattern image PI, and the internal parameters of the zoom lens 11. The position estimating section 343 specifies the epipolar plane K including the fourth reference point I1, the principal point position E of the imaging lens 21, and the third reference point D1.

Figure 10:
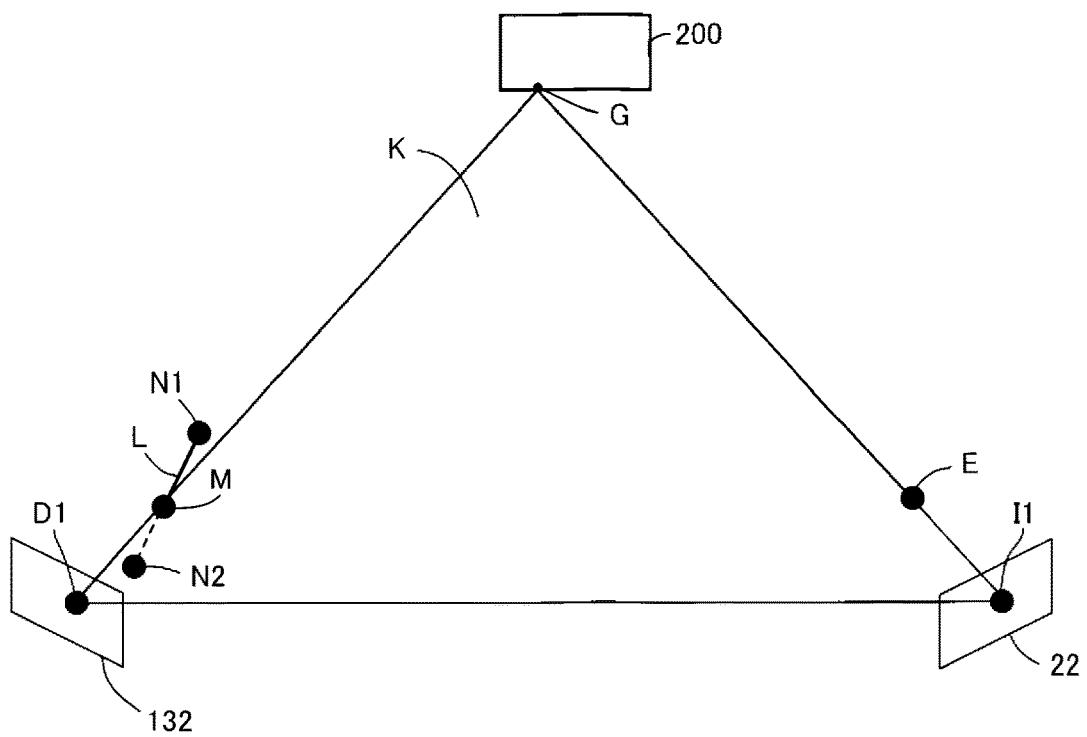
FIG. 10 is a diagram for explaining an estimation method for a projection-time principal point position.

Subsequently, the position estimating section 343 specifies a specific straight line L passing the first position N1 and the second position N2. The position estimating section 343 specifies the first position N1 and the second position N2 by referring to the storing section 33. Subsequently, as shown in FIG. 10, the position estimating section 343 estimates an intersection M of the specific straight line L and the epipolar plane K as a projection-time principal point position.

The characteristic-value estimating section 344 estimates, based on a first characteristic value representing a characteristic of the zoom lens 11 at the time when the principal point of the zoom lens 11 is present in the first position N1 and a second characteristic value representing a characteristic of the zoom lens 11 at the time when the principal point of the zoom lens 11 is present in the second position N2, a characteristic value representing a characteristic of the zoom lens 11 at the time when the principal point of the zoom lens 11 is present in the estimated projection-time principal point position.

For example, the characteristic-value estimating section 344 executes interpolation processing, in which the first characteristic value and the second characteristic value are used, according to the distance between the estimated projection-time principal point position and the first position N1 and the distance between the estimated projection-time principal point position and the second position N2 to thereby estimate a characteristic value of the zoom lens 11 at the time when the principal point of the zoom lens 11 is present in the estimated projection-time principal point position.

When the first characteristic value is the first focal length f1 of the zoom lens 11 and the second characteristic value is the second focal length f2 of the zoom lens 11, the characteristic value of the zoom lens 11 at the time when the principal point of the zoom lens 11 is present in the estimated projection-time principal point position is the focal length f3 of the zoom lens 11 at the time when the principal point of the zoom lens 11 is present in the estimated projection-time principal point position.

When the first characteristic value is lens distortion of the zoom lens 11 at the time when the principal point of the zoom lens 11 is present in the first position N1 and the second characteristic value is lens distortion of the zoom lens 11 at the time when the principal point of the zoom lens 11 is present in the second position N2, the characteristic value of the zoom lens 11 at the time when the principal point of the zoom lens 11 is present in the estimated projection-time principal point position is lens distortion of the zoom lens 11 at the time when the principal point of the zoom lens 11 is present in the estimated projection-time principal point position.

The characteristic-value estimating section 344 further estimates, as positional relation information, the translation matrix T1 representing a positional relation between the estimated projection-time principal point position and the principal point position of the imaging lens 21.

The measuring section 345 converts the second coordinate system H2 into the first coordinate system H1 by using the rotation matrix R1 stored in the third storing section 333 and the estimated translation matrix T1. Accordingly, the principal point position C of the zoom lens 11, the position of the first reference point D, the position of the virtual liquid crystal light valve 132V, the principal point position E of the imaging lens 21, the position of the second reference point I and the position of the virtual image sensor 22V are respectively represented by coordinates of the first coordinate system H1.

The measuring section 345 calculates $Z=T((1/\tan \alpha)+(1/\tan \beta))$ using the positions represented by the coordinates of the first coordinate system H1.

The measuring section 345 measures a three-dimensional shape of the object 200 by calculating the distance Z while changing the measurement point G.

A12: Explanation of Operation

In this embodiment, as explained above, the estimation target parameters are the focal length of the zoom lens 11, the lens distortion of the zoom lens 11, and the translation matrix T1. In relation to these parameters, it is necessary to estimate the principal point position C of the zoom lens 11 and the position of the virtual liquid crystal light valve 132V.

The position estimating section 343 and the characteristic-value estimating section 344 estimate a projection-time principal point position and estimation target parameters by using the fact that, even if the principal point position C of the zoom lens 11 fluctuates, each of the substantive position of the liquid crystal light valve 132, the substantive position of the image sensor 22, and the principal point position E of the imaging lens 21 does not fluctuate.

First, in calibration before shipment of the measurement apparatus 100, the first characteristic information is stored in the first storing section 331, the second characteristic information is stored in the second storing section 332, and the third characteristic information is stored in the third storing section 333.

Figure 11:
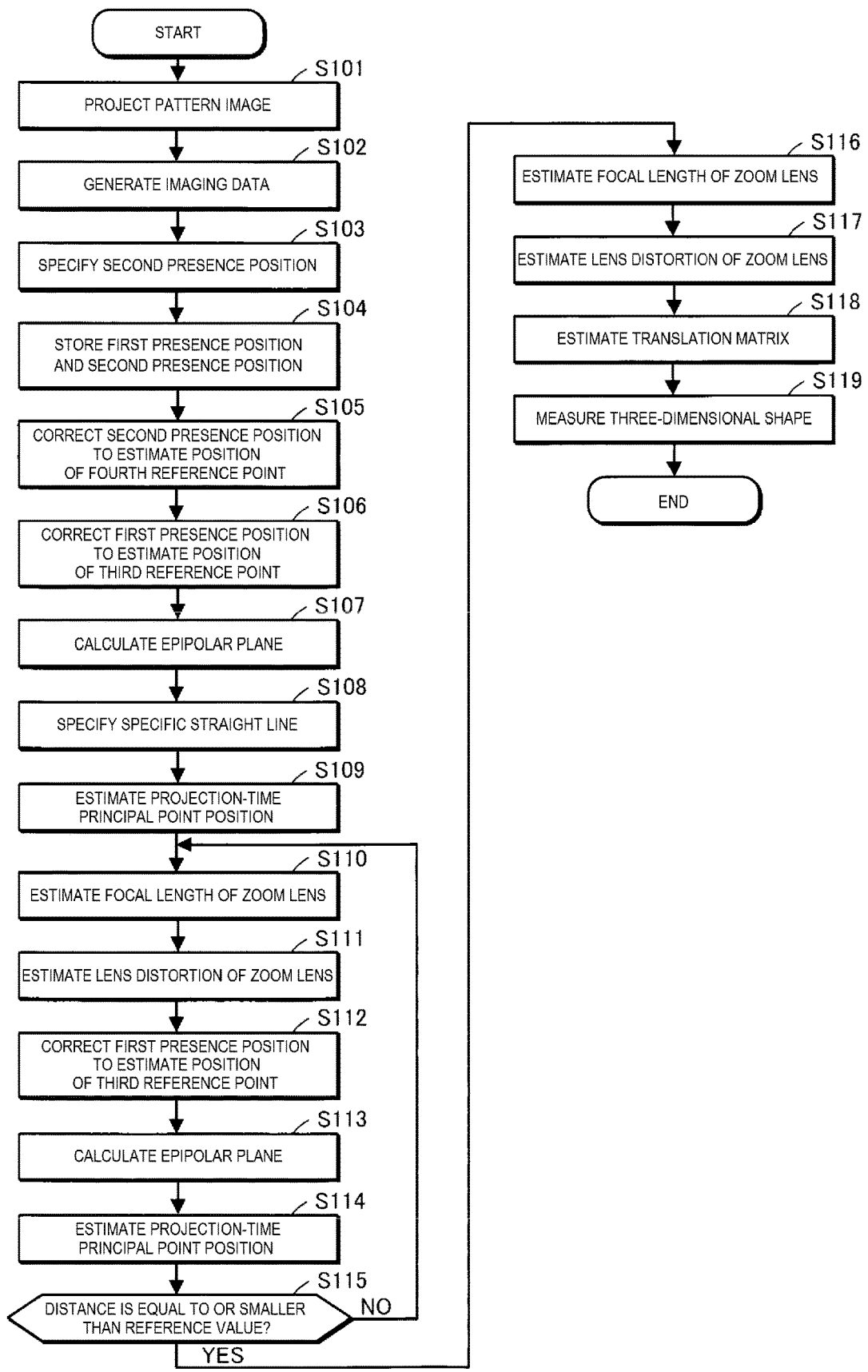
FIG. 11 is a flowchart for explaining estimation of estimation target parameters and measurement of a three-dimensional shape of the object.

After the shipment of the measurement apparatus 100, estimation of estimation target parameters and measurement of a three-dimensional shape of the object 200 are sequentially executed. FIG. 11 is a flowchart for explaining the estimation of estimation target parameters and the measurement of a three-dimensional shape of the object 200.

When the operation section 31 receives an operation instruction from the user, in step S101, the projection control section 341 causes the projecting section 13 to project the pattern image PI illustrated in FIG. 3 onto the object 200 via the zoom lens 11.

Subsequently, in step S102, the camera control section 342 causes the camera 2 to capture the pattern image PI on the object 200 to thereby generate imaging data.

Subsequently, in step S103, the position estimating section 343 analyzes a captured image represented by the imaging data to thereby specify, as shown in FIG. 8, in the image sensor 22, a position of the second presence position I2 corresponding to the first presence position D2. The first presence position D2 is, for example, any one of the twenty-four white dots WD shown in FIG. 3.

Subsequently, in step S104, the position estimating section 343 stores, in the storing section 33, the first presence position D2 in the liquid crystal light valve 132 and the second presence position I2 in the image sensor 22.

Subsequently, in step S105, the position estimating section 343 reads, from the third storing section 333, the internal parameters of the imaging lens 21, specifically, the focal length f5 of the imaging lens 21, the lens distortion of the imaging lens 21, the center offset during the attachment of the imaging lens 21, and the optical axis angle deviation during the attachment of the imaging lens 21. Subsequently, the position estimating section 343 estimates a position of the fourth reference point I1 by correcting the second presence position I2 based on the internal parameters of the imaging lens 21. Since the imaging lens 21 does not have the zoom function, the internal parameters of the imaging lens 21 do not fluctuate.

Subsequently, in step S106, the position estimating section 343 estimates the position of the third reference point D1 by correcting the first presence position D2 based on the internal parameters of the zoom lens 11, specifically, the focal length of the zoom lens 11, the lens distortion of the zoom lens 11, the center offset during the attachment of the zoom lens 11, and the optical axis angle deviation during the attachment of the zoom lens 11.

Since the zoom lens 11 has the zoom function, in this stage, among the internal parameters of the zoom lens 11, the focal length of the zoom lens 11 and the lens distortion of the zoom lens 11 are unknown.

Accordingly, in step S106, the position estimating section 343 reads out, from the first storing section 331, the first focal length f1 of the zoom lens 11 at the time when the position of the principal point of the zoom lens 11 is the first position N1 and the lens distortion of the zoom lens 11 at the time when the position of the principal point of the zoom lens 11 is the first position N1 and further reads out, from the third storing section 333, the center offset during the attachment of the zoom lens 11 and the optical axis angle deviation during the attachment of the zoom lens 11.

Subsequently, the position estimating section 343 estimates a position of the third reference point D1 by correcting the first presence position D2 based on the parameters read out from the first storing section 331 and the parameters read out from the third storing section 333.

The position estimating section 343 may use the second focal length f2 of the zoom lens 11 at the time when the position of the principal point of the zoom lens 11 is the second position N2 and the lens distortion of the zoom lens 11 at the time when the position of the principal point of the zoom lens 11 is the second position N2 instead of the first focal length f1 of the zoom lens 11 at the time when the position of the principal point of the zoom lens 11 is the first position N1 and the lens distortion of the zoom lens 11 at the time when the position of the principal point of the zoom lens 11 is the first position N1. In this case, the position estimating section 343 reads out, from the second storing section 332, the second focal length f2 of the zoom lens 11 and the lens distortion of the zoom lens 11 at the time when the position of the principal point of the zoom lens 11 is the second position N2.

Subsequently, in step S107, the position estimating section 343 calculates the epipolar plane K including the position of the fourth reference point I1, the position of the third reference point D1, and the principal point position E of the imaging lens 21. The principal point position E of the imaging lens 21 is specified based on the internal parameters of the imaging lens 21 and the substantive position of the image sensor 22.

Subsequently, in step S108, the position estimating section 343 specifies the specific straight line L passing the first position N1 and the second position N2.

Subsequently, in step S109, as illustrated in FIG. 10, the position estimating section 343 estimates the intersection M of the specific straight line L and the epipolar plane K as a projection-time principal point position.

Subsequently, in step S110, the characteristic-value estimating section 344 estimates, using the estimated projection-time principal point position, a focal length of the zoom lens 11 at the time when the principal point of the zoom lens 11 is present in the estimated projection-time principal point position.

In step S110, the characteristic-value estimating section 344 estimates, based on the first focal length f1 of the zoom lens 11 at the time when the principal point of the zoom lens 11 is present in the first position N1 and the second focal length f2 of the zoom lens 11 at the time when the principal point of the zoom lens 11 is in the second position N2, a focal length of the zoom lens 11 at the time when the principal point of the zoom lens 11 is present in the estimated projection-time principal point position.

For example, the characteristic-value estimating section 344 executes interpolation processing, in which the first focal length f1 and the second focal length f2 are used, according to a first distance P1 between the estimated projection-time principal point position and the first position N1 and a second distance P2 between the estimated projection-time principal point position and the second position N2 to thereby estimate a focal length of the zoom lens 11 at the time when the principal point of the zoom lens 11 is present in the estimated projection-time principal point position.

As an example, the characteristic-value estimating section 344 calculates the following as the focal length f3 of the zoom lens 11 at the time when the principal point of the zoom lens 11 is present in the estimated projection-time principal point position.

$$f3=f1(P2/(P1+P2))+f2(P1/(P1+P2))$$

Subsequently, in step S111, the characteristic-value estimating section 344 estimates lens distortion of the zoom lens 11 at the time when the principal point of the zoom lens 11 is present in the estimated projection-time principal point position.

In step S111, the characteristic-value estimating section 344 estimates, based on first lens distortion Q1 of the zoom lens 11 at the time when the principal point of the zoom lens 11 is present in the first position N1 and second lens distortion Q2 of the zoom lens 11 at the time when the principal point of the zoom lens 11 is present in the second position N2, lens distortion of the zoom lens 11 at the time when the principal point of the zoom lens 11 is present in the estimated projection-time principal point position.

Figure 12:
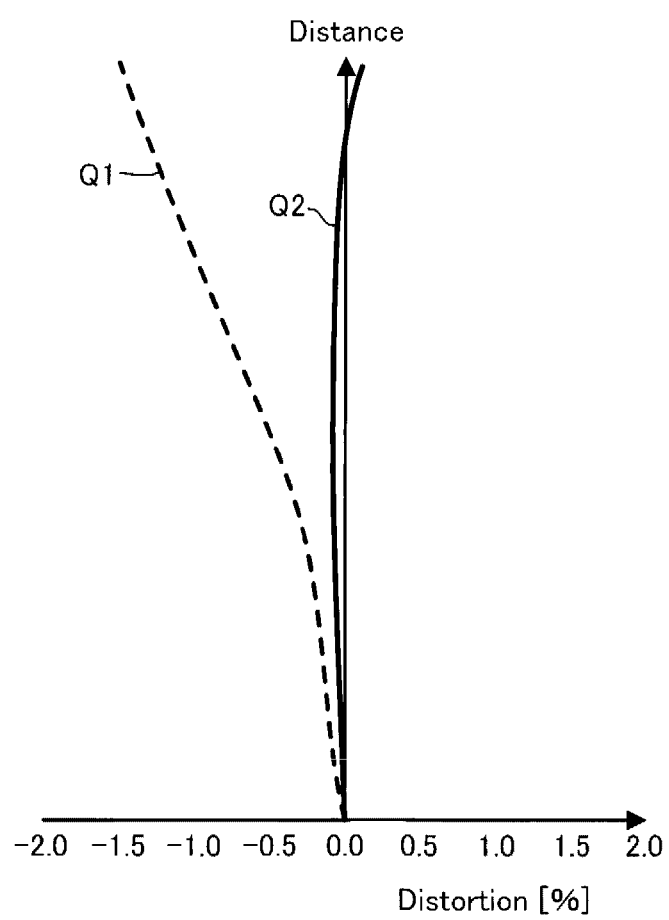
FIG. 12 is a diagram showing an example of first lens distortion and second lens distortion.

FIG. 12 is a diagram showing an example of the first lens distortion Q1 and the second lens distortion Q2. In FIG. 12, the horizontal axis represents a distortion rate and the vertical axis represents the distance from the center of the liquid crystal light valve 132. For example, the characteristic-value estimating section 344 executes interpolation processing, in which the first lens distortion Q1 and the second lens distortion Q2 are used, according to the first distance P1 and the second distance P2 to thereby estimate lens distortion of the zoom lens 11 at the time when the principal point of the zoom lens 11 is present in the estimated projection-time principal point position. In the example shown in FIG. 12, the characteristic-value estimating section 344 estimates, at every distance from the center of the liquid crystal light valve 132, lens distortion of the zoom lens 11 at the time when the principal point of the zoom lens 11 is present in the estimated projection-time principal point position.

Subsequently, in step S112, the position estimating section 343 estimates a position of the third reference point D1 using the internal parameters of the zoom lens 11 estimated by the characteristic-value estimating section 344 and the internal parameters of the zoom lens 11 stored in the third storing section 333.

Specifically, the position estimating section 343 estimates a position of a new third reference point D1a by correcting the first presence position D2 anew based on the focal length of the zoom lens 11 estimated by the characteristic-value estimating section 344, the lens distortion of the zoom lens 11 estimated by the characteristic-value estimating section 344, the center offset during the attachment of the zoom lens 11 stored in the third storing section 333, and the optical axis angle deviation during the attachment of the zoom lens 11 stored in the third storing section 333.

The position of the fourth reference point I1 does not depend on the internal parameters of the zoom lens 11 and depends on the internal parameters of the imaging lens 21. Therefore, the position estimating section 343 does not change the position of the fourth reference point I1.

Subsequently, in step S107, the position estimating section 343 calculates the epipolar plane K including the position of the fourth reference point I1, the position of the third reference point D1, and the principal point position E of the imaging lens 21. The principal point position E of the imaging lens 21 is specified based on the internal parameters of the imaging lens 21 and the substantive position of the image sensor 22.

Subsequently, in step S114, the position estimating section 343 estimates an intersection M1 of the new epipolar plane K1 and the specific straight line L as a new projection-time principal point position.

Subsequently, in step S115, the position estimating section 343 determines whether the distance between the new projection-time principal point position and the projection-time principal point position estimated last time is equal to or smaller than a reference value. As the reference value, for example, 10 µm is used. The reference value may be larger than 10 µm or may be smaller than 10 µm.

When the distance is larger than the reference value in step S115, processing returns to step S110.

When the distance is equal to or smaller than the reference value in step S115, in step S116, the characteristic-value estimating section 344 estimates, anew, using the new projection-time principal point position, a focal length of the zoom lens 11 at the time when the principal point of the zoom lens 11 is present in the new projection-time principal point position. An estimation method for a focal length of the zoom lens 11 in step S116 is the same as the estimation method in step S110.

Subsequently, in step S117, the characteristic-value estimating section 344 estimates lens distortion of the zoom lens 11 at the time when the principal point of the zoom lens 11 is present in the new projection-time principal point position. An estimation method for lens distortion of the zoom lens 11 in step S117 is the same as the estimation method in step S111.

Subsequently, in step S118, the characteristic-value estimating section 344 estimates the translation matrix T1 based on a deviation amount between the new projection-time principal point position and the principal point position E of the imaging lens 21.

Accordingly, at the end time of step S118, parameters that need to be estimated according to the zoom function of the zoom lens 11, that is, estimation target parameters are estimated.

Subsequently, in step S119, the measuring section 345 measures a three-dimensional shape of the object 200. In step S119, first, the measuring section 345 controls the projection control section 341 to thereby cause the projection device 1 to project a gray code pattern toward the object 200. Subsequently, the measuring section 345 controls the camera control section 342 to thereby cause the camera 2 to image the gray code pattern on the object 200 to thereby generate imaging data. Subsequently, the measuring section 345 specifies the length T, tan $\alpha$, and tan $\beta$ shown in FIG. 6 and FIG. 7 using the focal length f3 of the zoom lens 11 estimated in step S116, the lens distortion of the zoom lens 11 estimated in step S117, the translation matrix T1 estimated in step S118, the imaging data, and the parameters, which do not fluctuate according to the zoom function of the zoom lens 11, stored in the third storing section 333.

Specifically, the measuring section 345 specifies the principal point position C of the zoom lens 11, the position of the third reference point D1, and the position of the first reference point D using the focal length f3 of the zoom lens 11, the lens distortion of the zoom lens 11, the center offset during the attachment of the zoom lens 11, the optical axis angle deviation during the attachment of the zoom lens 11, and the substantive position of the liquid crystal light valve 132.

Further, the measuring section 345 specifies the principal point position E of the imaging lens 21, the position of the fourth reference point I1, and the position of the second reference point I using the focal length f5 of the imaging lens 21, the lens distortion of the imaging lens 21, the center offset during the attachment of the imaging lens 21, the optical axis angle deviation during the attachment of the imaging lens 21, and the substantive position of the image sensor 22.

Subsequently, the measuring section 345 converts the principal point position E of the imaging lens 21, the position of the fourth reference point I1, and the position of the second reference point I into coordinate positions in the first coordinate system H1 using the rotation matrix R1 and the translation matrix T1.

Subsequently, the measuring section 345 calculates the distance Z to the measurement point G of the object 200 based on the expression $Z=T((1/\tan \alpha)+(1/\tan \beta))$ using the coordinate positions in the first coordinate system H1. The measuring section 345 measures a three-dimensional shape of the object 200 by calculating the distance Z while changing the measurement point G.

A13: Overview of the First Embodiment

The estimation method, the measurement method, and the measurement apparatus 100 according to this embodiment include the following aspects.

The projecting section 13 projects the pattern image PI onto the object 200 via the zoom lens 11. The camera 2 generates imaging data by capturing the pattern image PI on the object 200. The position estimating section 343 estimates, based on the imaging data, the principal point position C of the zoom lens 11 during the projection of the pattern image PI. The characteristic-value estimating section 344 estimates, based on a first characteristic value representing a characteristic of the zoom lens 11 at the time when the principal point of the zoom lens 11 is present in the first position N1 and a second characteristic value representing a characteristic of the zoom lens 11 at the time when the principal point of the zoom lens 11 is present in the second position N2, a characteristic value representing a characteristic of the zoom lens 11 at the time when the principal point of the zoom lens 11 is present in the estimated position. According to this aspect, it is unnecessary to repeat, in order to obtain parameters necessary for three-dimensional measurement, projection and imaging while moving an object or while moving one of the projection device and the imaging device. Accordingly, it is possible to easily obtain the parameters necessary for the three-dimensional measurement.

The characteristic-value estimating section 344 executes interpolation processing, in which the first characteristic value and the second characteristic value are used, according to the distance between the position estimated by the position estimating section 343 and the first position N1 and the distance between the estimated position and the second position N2 to thereby estimate a characteristic value of the zoom lens 11 at the time when the principal point of the zoom lens 11 is present in the estimated position. According to this aspect, it is possible to easily obtain, with the interpolation processing in which the first characteristic value and the second characteristic value are used, the parameters necessary for the three-dimensional measurement.

The focal length of the zoom lens is changeable in a range of the first focal length to the second focal length. The first position N1 is a position of the principal point of the zoom lens at the time when the focal length is the first focal length. The second position N2 is a position of the principal point of the zoom lens at the time when the focal length is the second focal length. According to this aspect, it is possible to set the first characteristic value and the second characteristic value according to so-called "tele end" and "wide end".

The first characteristic value is a focal length of the zoom lens 11 at the time when the principal point of the zoom lens 11 is present in the first position N1. The second characteristic value is a focal length of the zoom lens 11 at the time when the principal point of the zoom lens 11 is present in the second position N2. A characteristic value of the zoom lens 11 at the time when the principal point of the zoom lens 11 is present in a position estimated by the position estimating section 343 is a focal length of the zoom lens 11 at the time when the principal point of the zoom lens 11 is present in the estimated position. According to this aspect, it is possible to estimate a focal length of the zoom lens 11 during projection of a pattern image.

The first characteristic value is lens distortion of the zoom lens 11 at the time when the principal point of the zoom lens 11 is present in the first position N1. The second characteristic value is lens distortion of the zoom lens 11 at the time when the principal point of the zoom lens 11 is present in the second position N2. A characteristic value of the zoom lens 11 at the time when the principal point of the zoom lens 11 is present in a position estimated by the position estimating section 343 is lens distortion of the zoom lens 11 at the time when the principal point of the zoom lens 11 is present in the estimated position. According to this aspect, it is possible to estimate lens distortion of the zoom lens 11 during projection of a pattern image.

The camera 2 includes the imaging lens 21 and the image sensor 22 that generates imaging data based on an optical image of a pattern image formed by the imaging lens 21. The characteristic-value estimating section 344 estimates the translation matrix T1 representing a positional relation between a position estimated by the position estimating section 343 and the position of the principal point of the imaging lens 21. According to this aspect, it is possible to estimate, among so-called external parameters, the translation matrix T1 that fluctuates according to the zoom function of the zoom lens 11.

The measuring section 345 measures a three-dimensional shape of the object 200 using a characteristic value of the zoom lens 11 at the time when the principal point of the zoom lens 11 is present in the estimated projection-time principal point position and the translation matrix T1. According to this aspect, it is possible to measure the three-dimensional shape of the object 200 using the characteristic value of the zoom lens 11, which fluctuates according to the zoom function of the zoom lens 11, and the translation matrix T1.

B: Modifications

Aspects of modifications of the embodiment illustrated above are illustrated below. Two or more aspects optionally selected from the following illustrations may be combined as appropriate in a range in which the aspects do not contradict one another.

B1: Modification 1

In this embodiment, the position corresponding to the "tele end" is used as the first position N1 and the position corresponding to the "wide end" is used as the second position N2. However, the first position N1 is not limited to the position corresponding to the "tele end" and can be changed as appropriate. The second position N2 is not limited to the position corresponding to the "wide end" and only has to be a position different from the first opposition N1.

B2: Modification 2

In this embodiment and the modification 1, when the center offset of the zoom lens 11 fluctuates according to the zoom function of the zoom lens 11, the characteristic-value estimating section 344 is capable of calculating a center offset of the zoom lens 11 during the projection of the pattern image by projecting the latest projection-time principal point position onto a plane representing the substantive position of the liquid crystal light valve 132.

B3: Modification 3

The first embodiment and the modifications 1 and 2 can be applied to a three-dimensional shape measuring device in general used in robotics and the like. The first embodiment and the modifications 1 and 2 can also be applied to a projector that measures a three-dimensional shape of a projection surface and geometrically corrects a projection image according to a measurement result of the three-dimensional shape. In this case, the camera 2 and the information processing device 3 are included in the projection device 1.

B4: Modification 4

In the first embodiment and the modifications 1 to 3, the position estimating section 343 may estimate a projection-time principal point position based on the position of the fourth reference point I1 by referring to a correspondence relation table indicating a correspondence relation between the position of the fourth reference point I1 and the projection-time principal point position. In other words, the position estimating section 343 may estimate a projection-time principal point position based on imaging data by referring to the correspondence relation table. The position estimating section 343 may estimate a projection-time principal point position based on the position of the fourth reference point I1 by using a function indicating a correspondence relation between the position of the fourth reference point I1 and the projection-time principal point position.

B5: Modification 5

In the first embodiment and the modifications 1 to 4, the liquid crystal light valve 132 is used as an example of the light modulation device. However, the light modulation device is not limited to the liquid crystal light valve and can be changed as appropriate. For example, the light modulation device may be a component of, for example, a type in which one digital mirror device is used. Besides the liquid crystal panel, the DMD, and the like, a component capable of modulating light emitted by the light source 131 can be adopted as the light modulation device.

What is claimed is:

1. An estimation method comprising:
    projecting a pattern image onto an object via a liquid crystal light valve and a zoom lens;
    generating imaging data by capturing, via an imaging lens and an image sensor, the pattern image on the object;
    estimating, based on the imaging data, a position of a principal point of the zoom lens during the projection of the pattern image, the estimating of the principal point position comprising:
        estimating a position of a first reference point by correcting a first presence position based on internal parameters of the zoom lens, the first presence position being where an image projected onto a measurement point of the object is actually present on the liquid crystal light valve;
        estimating a position of a second reference point by correcting a second presence position based on internal parameters of the imaging lens, the second presence position corresponding to the first presence position and being where an image of the measurement point of the object is actually present on the image sensor;
        calculating an epipolar plane that includes the position of the first reference point, the position of the second reference point, and a principal point position of the imaging lens;
        specifying a straight line connecting a first position of the principal point of the zoom lens and a second position of the principal point of the zoom lens; and
        estimating an intersection between the straight line and the calculated epipolar plane; and
    estimating, based on a first characteristic value representing a characteristic of the zoom lens at a time when the principal point of the zoom lens is present in the first position and a second characteristic value representing a characteristic of the zoom lens at a time when the principal point of the zoom lens is present in the second position, a characteristic value representing a characteristic of the zoom lens at a time when the principal point of the zoom lens is present in the estimated position.

2. The estimation method according to claim 1, wherein the characteristic value of the zoom lens at the time when the principal point of the zoom lens is present in the estimated position is estimated by executing interpolation processing, in which the first characteristic value and the second characteristic value are used, according to a distance between the estimated position and the first position and a distance between the estimated position and the second position.

3. The estimation method according to claim 1, wherein a focal length of the zoom lens is changeable in a range of a first focal length to a second focal length,
    the first position is a position of the principal point of the zoom lens at a time when the focal length is the first focal length, and
    the second position is a position of the principal point of the zoom lens at a time when the focal length is the second focal length.

4. The estimation method according to claim 1, wherein the first characteristic value is a focal length of the zoom lens at the time when the principal point of the zoom lens is present in the first position,
    the second characteristic value is a focal length of the zoom lens at the time when the principal point of the zoom lens is present in the second position, and
    the characteristic value of the zoom lens at the time when the principal point of the zoom lens is present in the estimated position is a focal length of the zoom lens at the time when the principal point of the zoom lens is present in the estimated position.

5. The estimation method according to claim 1, wherein the first characteristic value is lens distortion of the zoom lens at the time when the principal point of the zoom lens is present in the first position,
    the second characteristic value is lens distortion of the zoom lens at the time when the principal point of the zoom lens is present in the second position, and
    the characteristic value of the zoom lens at the time when the principal point of the zoom lens is present in the estimated position is lens distortion of the zoom lens at the time when the principal point of the zoom lens is present in the estimated position.

6. The estimation method according to claim 1, wherein the imaging data is generated by capturing the pattern image on the object with a camera,
    the camera includes the imaging lens and the image sensor that generates the imaging data based on an optical image of the pattern image formed by the imaging lens, and
    the estimation method further comprises estimating positional relation information representing a positional relation between the estimated position and a position of the principal point of the imaging lens.

7. A measurement method comprising:
    the estimation method according to claim 6; and
    measuring a three-dimensional shape of the object using the characteristic value of the zoom lens at the time when the principal point of the zoom lens is present in the estimated position and the positional relation information.

8. An estimation apparatus comprising:
    a projecting section configured to project a pattern image onto an object via a liquid crystal light valve and a zoom lens;

a camera configured to generate imaging data by capturing, via an imaging lens and an image sensor, the pattern image on the object;

a position estimating section configured to estimate, based on the imaging data, a position of a principal point of the zoom lens during the projection of the pattern image, the estimating of the principal point position comprising:

- estimating a position of a first reference point by correcting a first presence position based on internal parameters of the zoom lens, the first presence position being where an image projected onto a measurement point of the object is actually present on the liquid crystal light value;
- estimating a position of a second reference point by correcting a second presence position based on internal parameters of the imaging lens, the second presence position corresponding to the first presence position and being where an image of the measurement point of the object is actually present on the image sensor;
- calculating an epipolar plane that includes the position of the first reference point, the position of the second reference point, and a principal point position of the imaging lens;
- specifying a straight line connecting a first position of the principal point of the zoom lens and a second position of the principal point of the zoom lens; and
- estimating an intersection between the straight line and the calculated epipolar plane; and a characteristic-value estimating section configured to estimate, based on a first characteristic value representing a characteristic of the zoom lens at a time when the principal point of the zoom lens is present in the first position and a second characteristic value representing a characteristic of the zoom lens at a time when the principal point of the zoom lens is present in the second position, a characteristic value representing a characteristic of the zoom lens at a time when the principal point of the zoom lens is present in the estimated position.

* * * * *